US009654794B2

(12) United States Patent
Ramasubramonian et al.

(10) Patent No.: US 9,654,794 B2
(45) Date of Patent: May 16, 2017

(54) METHODS FOR CODING AN INTER-LAYER REFERENCE PICTURE SET (RPS) AND CODING END OF BITSTREAM (EOB) NETWORK ACCESS LAYER (NAL) UNITS IN MULTI-LAYER CODING

(71) Applicant: QUALCOMM Incorporated, San Diego, CA (US)

(72) Inventors: Adarsh Krishnan Ramasubramonian, San Diego, CA (US); Fnu Hendry, Poway, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 14/584,994

(22) Filed: Dec. 29, 2014

(65) Prior Publication Data
US 2015/0195563 A1 Jul. 9, 2015

Related U.S. Application Data

(60) Provisional application No. 61/923,607, filed on Jan. 3, 2014.

(51) Int. Cl.
H04N 19/30 (2014.01)
H04N 19/573 (2014.01)
(Continued)

(52) U.S. Cl.
CPC ......... *H04N 19/573* (2014.11); *H04N 19/105* (2014.11); *H04N 19/172* (2014.11);
(Continued)

(58) Field of Classification Search
CPC .......................... H04N 19/52; H04N 19/577
See application file for complete search history.

(56) References Cited

U.S. PATENT DOCUMENTS

2014/0161151 A1* 6/2014 Proctor .................. G01K 13/02
374/147
2014/0161181 A1* 6/2014 Samuelsson ......... H04N 19/503
375/240.12
(Continued)

FOREIGN PATENT DOCUMENTS

WO WO-2008047304 A1 4/2008
WO WO-2013009237 A1 1/2013

OTHER PUBLICATIONS

Bross B., et al., "High Efficiency Video Coding (HEVC) text Specification draft 10 (for FDIS & Consent)," 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); Retrieved from the Internet < URL: http://wftp3.itu.int/av-arch/jctvc-site/, >, No. JCTVC-L1003_v1, Jan. 17, 2013 (Jan. 17, 2013), 321 pages, XP030113948.
(Continued)

Primary Examiner — William C Vaughn, Jr.
Assistant Examiner — Jerry Jean Baptiste
(74) Attorney, Agent, or Firm — Knobbe, Martens, Olson & Bear, LLP

(57) ABSTRACT

Methods for coding an inter-layer reference picture set (RPS) and coding end of bitstream (EoB) network access (NAL) units in multi-layer coding are disclosed. In one aspect, the method includes determining whether a candidate inter-layer reference picture is present in the video information. The video information includes an inter-layer RPS including a plurality of subsets. The method further includes determining an inter-layer RPS subset to which the candidate inter-layer reference picture belongs in response to determining that the candidate inter-layer reference picture is not present, and indicating that no reference picture
(Continued)

is present in the inter-layer RPS subset to which the candidate inter-layer reference picture belongs.

8 Claims, 11 Drawing Sheets

(51) Int. Cl.
<table>
<tr><td>H04N 19/46</td><td>(2014.01)</td></tr>
<tr><td>H04N 19/52</td><td>(2014.01)</td></tr>
<tr><td>H04N 19/577</td><td>(2014.01)</td></tr>
<tr><td>H04N 19/597</td><td>(2014.01)</td></tr>
<tr><td>H04N 19/105</td><td>(2014.01)</td></tr>
<tr><td>H04N 19/70</td><td>(2014.01)</td></tr>
<tr><td>H04N 19/172</td><td>(2014.01)</td></tr>
<tr><td>H04N 19/44</td><td>(2014.01)</td></tr>
<tr><td>H04N 19/65</td><td>(2014.01)</td></tr>
</table>

(52) U.S. Cl.
CPC ............ *H04N 19/30* (2014.11); *H04N 19/44* (2014.11); *H04N 19/46* (2014.11); *H04N 19/52* (2014.11); *H04N 19/577* (2014.11); *H04N 19/597* (2014.11); *H04N 19/65* (2014.11); *H04N 19/70* (2014.11)

(56) References Cited

U.S. PATENT DOCUMENTS

<table>
<tr><td>2015/0103886 A1*</td><td>4/2015</td><td>He</td><td>H04N 19/188<br>375/240.02</td></tr>
<tr><td>2015/0195564 A1</td><td>7/2015</td><td>Ramasubramonian et al.</td><td></td></tr>
<tr><td>2016/0165242 A1*</td><td>6/2016</td><td>Lee</td><td>H04N 19/30<br>375/240.08</td></tr>
</table>

OTHER PUBLICATIONS

Bross B., et al., "High Efficiency Video Coding (HEVC) text specification draft 10 (for FDIS & Consent)", 12, JCT-VC Meeting; 103, MPEG Meeting; Jan. 14, 2013-Jan. 23, 2013; Geneva; (Joint Collaborative Team on Video Coding of ISO/IEC JTC1/SC29/ WG11 and ITU-T SG.16); URL: http://wftp3.itu.int/av-arch/jctvc-site/,, No. JCTVC-L1003, Jan. 17, 2013 (Jan. 17, 2013), 320 Pages, XP030113948.

Chen J., et al., "High efficient video coding (HEVC) scalable extension Draft 4," 15. JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-O1008, Nov. 14, 2013 (Nov. 14, 2013), XP030115462, pp. 74.

International Search Report and Written Opinion—PCT/US2014/ 072717—ISA/EPO—Jun. 10, 2015.

Partial International Search Report—PCT/US2014/072717—ISA/ EPO—Mar. 13, 2015.

Ramasubramonian A.K., et al., "MV-HEVC/SHVC HLS: Miscellaneous HLS topics", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0130, Jan. 4, 2014 (Jan. 4, 2014), pp. 1-10, XP030115636.

Rapaka K., et al., "MV-HEVC/SHVC HLS: On inter-layer RPS derivation and sub-layer inter-layer dependency", 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0080, Oct. 15, 2013 (Oct. 15, 2013), XP030131488, pp. 1-6.

Sjoberg R., et al., "Overview of HEVC High-Level Syntax and Reference Picture Management," IEEE Transactions on Circuits and Systems for Video Technology, vol. 22 (12), XP011487159, Dec. 2012, pp. 1858-1870, ISSN:1051-8215, DOI: 10.1109/ TCSVT.2012.2223052.

Tech G., et al., "MV-HEVC Draft Text 6," 6. JCT-3V Meeting; Oct. 25, 2013-Nov. 1, 2013; Geneva; (The Joint Collaborative Team on 3D Video Coding Extension Development of ISO/IEC JTC1/SC29/ WG11 and ITU-T SG.16); URL: http://phenix.int-evry.fr/jct2/, No. JCT3V-F1004, Nov. 7, 2013 (Nov. 7, 2013), XP030131734, pp. 84.

Tsukuba T., et al., "MV-HEVC/SHVC HLS: On sub-bitstream extraction", 16, JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0047, Dec. 29, 2013 (Dec. 29, 2013), pp. 1-3, XP030115509.

\* cited by examiner

METHODS FOR CODING AN INTER-LAYER REFERENCE PICTURE SET (RPS) AND CODING END OF BITSTREAM (EOB) NETWORK ACCESS LAYER (NAL) UNITS IN MULTI-LAYER CODING

INCORPORATION BY REFERENCE TO ANY PRIORITY APPLICATION(S)

This application claims the benefit of U.S. Provisional Application 61/923,607, filed Jan. 3, 2014.

BACKGROUND

Technical Field

This disclosure relates to the field of video coding and compression, particularly to scalable video coding, multiview video coding, and/or three-dimensional (3D) video coding.

Description of the Related Art

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

An encoded video sequence may include a reference picture set (RPS) that is associated with a picture and contains reference picture lists that identify pictures that may be used for inter prediction of the associated picture or any following pictures. An RPS may also include pictures used for inter-layer prediction. An encoded video sequence may also include an end of bitstream (EoB) network access layer (NAL) unit which is optionally included at the end of an access unit. In multi-layer coding schemes, NAL units include a layer identifier which identifies a layer to which the NAL unit belongs.

SUMMARY

The systems, methods and devices of this disclosure each have several innovative aspects, no single one of which is solely responsible for the desirable attributes disclosed herein.

In one aspect, a method for coding video information of a multilayer bitstream comprises determining whether a candidate inter-layer reference picture is present in the video information, wherein the video information comprises an inter-layer reference picture set (RPS) including a plurality of subsets, in response to determining that the candidate inter-layer reference picture is not present, determining an inter-layer RPS subset to which the candidate inter-layer reference picture belongs, indicating that no reference picture is present in the inter-layer RPS subset to which the candidate inter-layer reference picture belongs, and coding the video information based at least in part on the indication that no reference picture is present in the inter-layer RPS subset.

In another aspect, a device for decoding video information of a multilayer bitstream comprises a memory configured to store the video information and a processor in communication with the memory and configured to: determine whether a candidate inter-layer reference picture is present in the video information, wherein the video information comprises an RPS including a plurality of subsets, in response to determining that the candidate inter-layer reference picture is not present, determine an inter-layer RPS subset to which the candidate inter-layer reference picture belongs, indicate that no reference picture is present in the inter-layer RPS subset to which the candidate inter-layer reference picture belongs, and decode the video information based at least in part on the indication that no reference picture is present in the inter-layer RPS subset.

In yet another aspect, a method for encoding video information of a multi-layer bitstream includes determining whether an access unit included in the video information includes an end of bitstream (EoB) network abstraction layer (NAL) unit; setting a layer-identification value for the EoB NAL unit to zero in accordance with a constraint; and encoding the video information based at least in part on a value of zero for the layer-identification value.

In still another aspect, a device for encoding video information of a multi-layer bitstream comprises a memory configured to store the video information and a processor in communication with the memory and configured to: determine whether an access unit included in the video information includes an EoB NAL unit; set the layer-identification value for the EoB NAL unit to zero in accordance with a constraint; and encode the video information based at least in part on a value of zero for the layer-identification value.

DETAILED DESCRIPTION

Figure 1A:
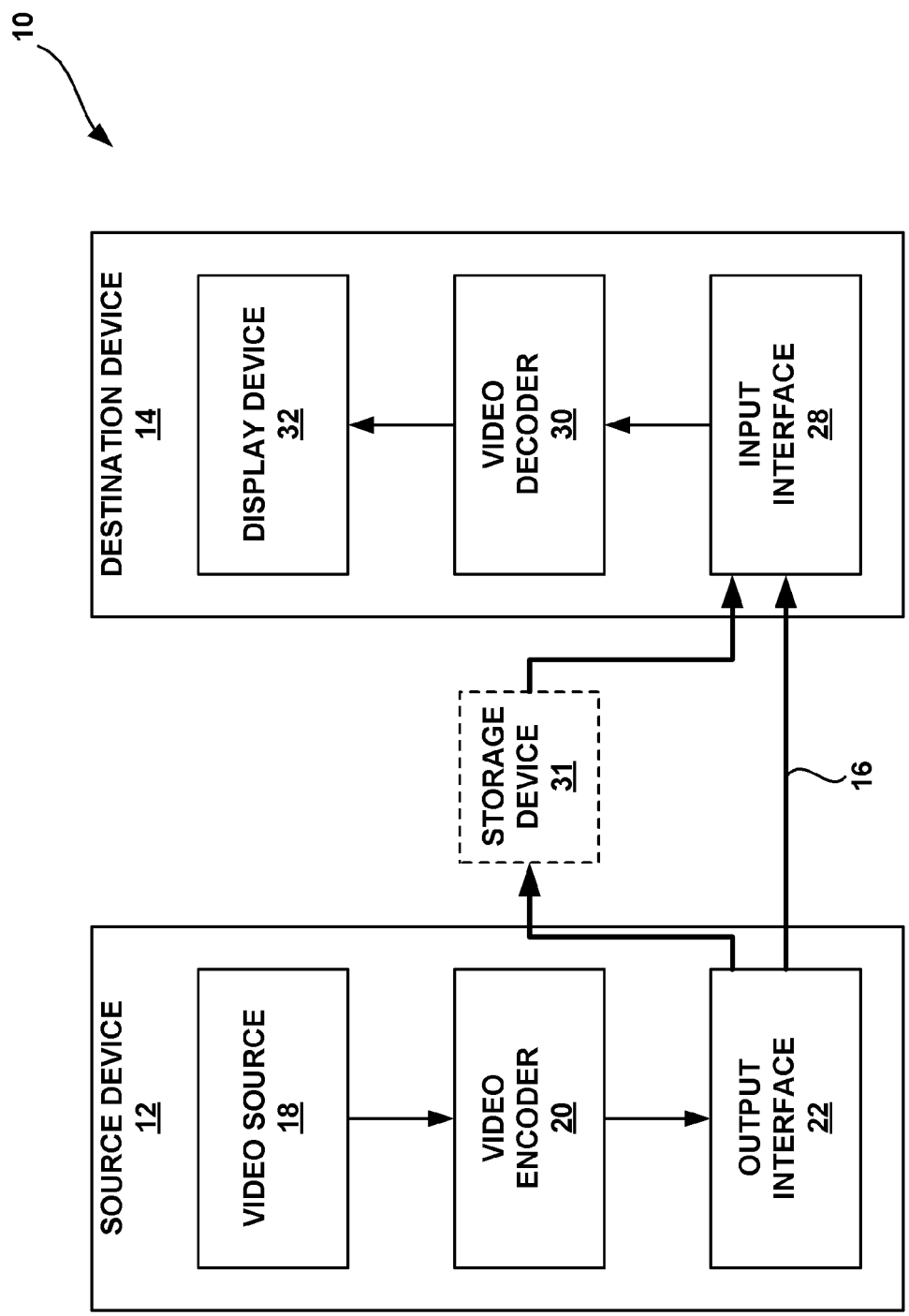
FIG. 1A is a block diagram illustrating an example video encoding and decoding system that may utilize techniques in accordance with aspects described in this disclosure.

Certain embodiments described herein relate to end of bitstream (EoB) network access layer (NAL) units and RPSs for multi-layer video coding in the context of advanced video codecs, such as High Efficiency Video Coding (HEVC). More specifically, the present disclosure relates to systems and methods for improved performance in the encoding or decoding of EoB NAL units and RPSs in the multiview and scalable extensions of HEVC, namely MV-HEVC and SHVC.

In the description below, H.264/Advanced Video Coding (AVC) techniques related to certain embodiments are described; the HEVC standard and related techniques are also discussed. In particular, some video coding schemes include access unit which can include an EoB NAL units which indicate the end of bitstream for the corresponding access unit. NAL units may have a layer identifier which identifies the layer that the NAL unit is included in. When the layer identifier of EoB NAL units is unrestricted, the EoB NAL unit may be dropped (or processed incorrectly) from the bitstream. Since correct decoding of the bitstream may rely on the presence of EoB NAL units, this may result in incorrect bitstream decoding. Some video coding schemes may also maintain a reference picture set (RPS) associated with a picture of the coded video sequence (CVS). The RPS for a given picture contains a set of reference pictures including all reference pictures prior to the associated picture in decoding order that may be used for inter prediction of the associated picture or any picture following the associated picture in decoding order. Conventional coding schemes do not determine which RPS inter-layer subset that an entry of "no reference picture" should be inserted into when a picture is dropped (or processed incorrectly) from the bitstream. Accordingly, the RPS inter-layer subsets may not have correct content.

This disclosure relates to semantics for multi-layer coding schemes that can prevent EoB NAL units from being dropped (or processed incorrectly) form the bitstream due to unrestricted layer identifiers. Specifically, the layer identifiers for EoB NAL units may be limited to prevent the EoB NAL units from being dropped, thereby enabling the correct decoding of the bitstream when reliant on the presence of EoB NAL units. This disclosure also relates to semantics for multi-layer coding schemes that can enter a "no reference picture" entry into the correct RPS inter-layer subset. Accordingly, entries of "no reference picture" can be entered into the correct RPS inter-layer subset based on a view identifier of the current picture.

While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its scalable and multiview extensions.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multiview video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its scalable and multiview extensions.

In addition, a video coding standard, namely HEVC, has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
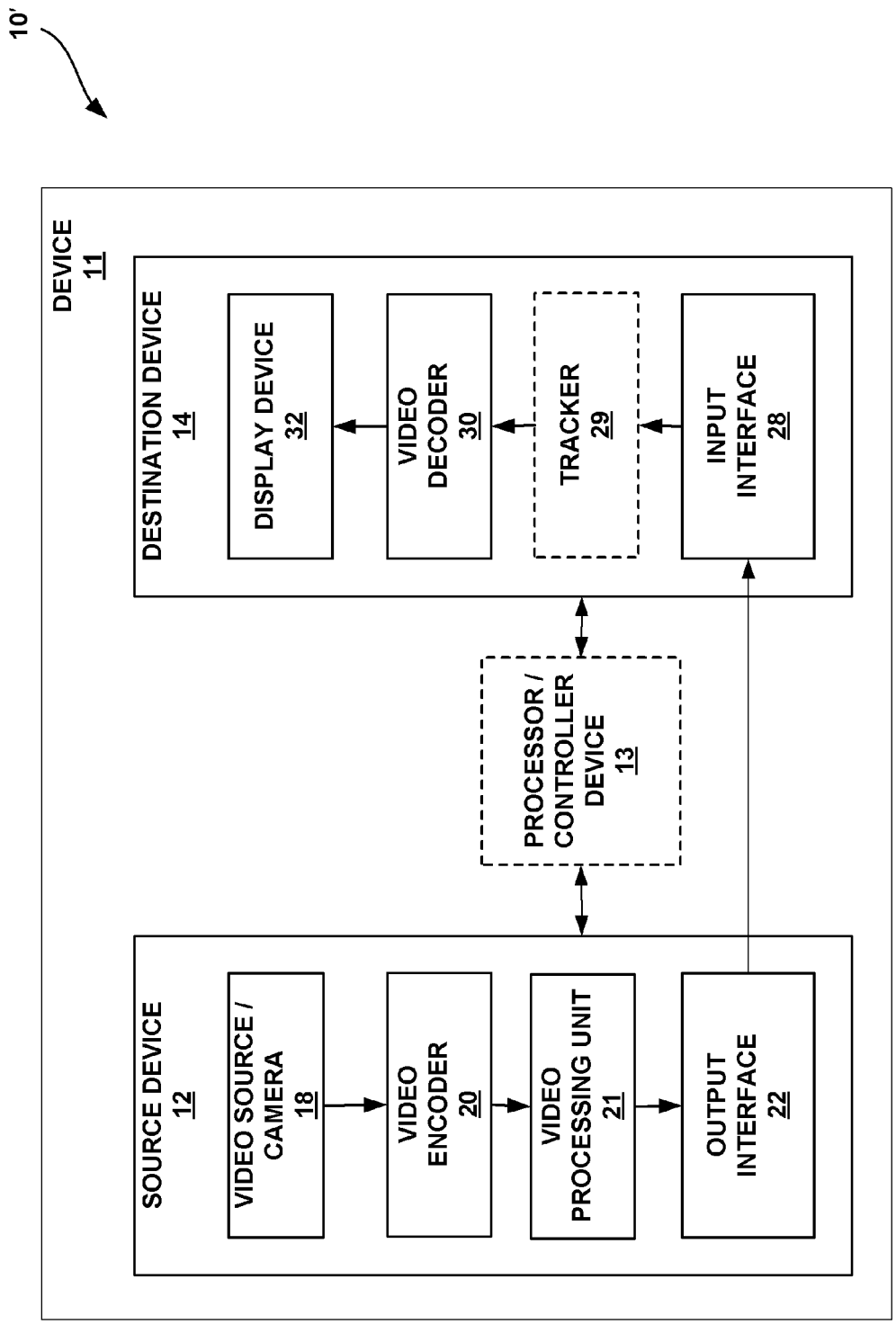
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller device 13. The video coding system 10' may also include a tracker 29 (optionally present), which can track an object of interest in a video sequence. The object or interest to be tracked may be segmented by a technique described in connection with one or more aspects of the present disclosure. In related aspects, the tracking may be performed by the display device 32, alone or in conjunction with the tracker 29. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. An PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more CUs. The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more PUs for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with TUs of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of NAL units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2A:
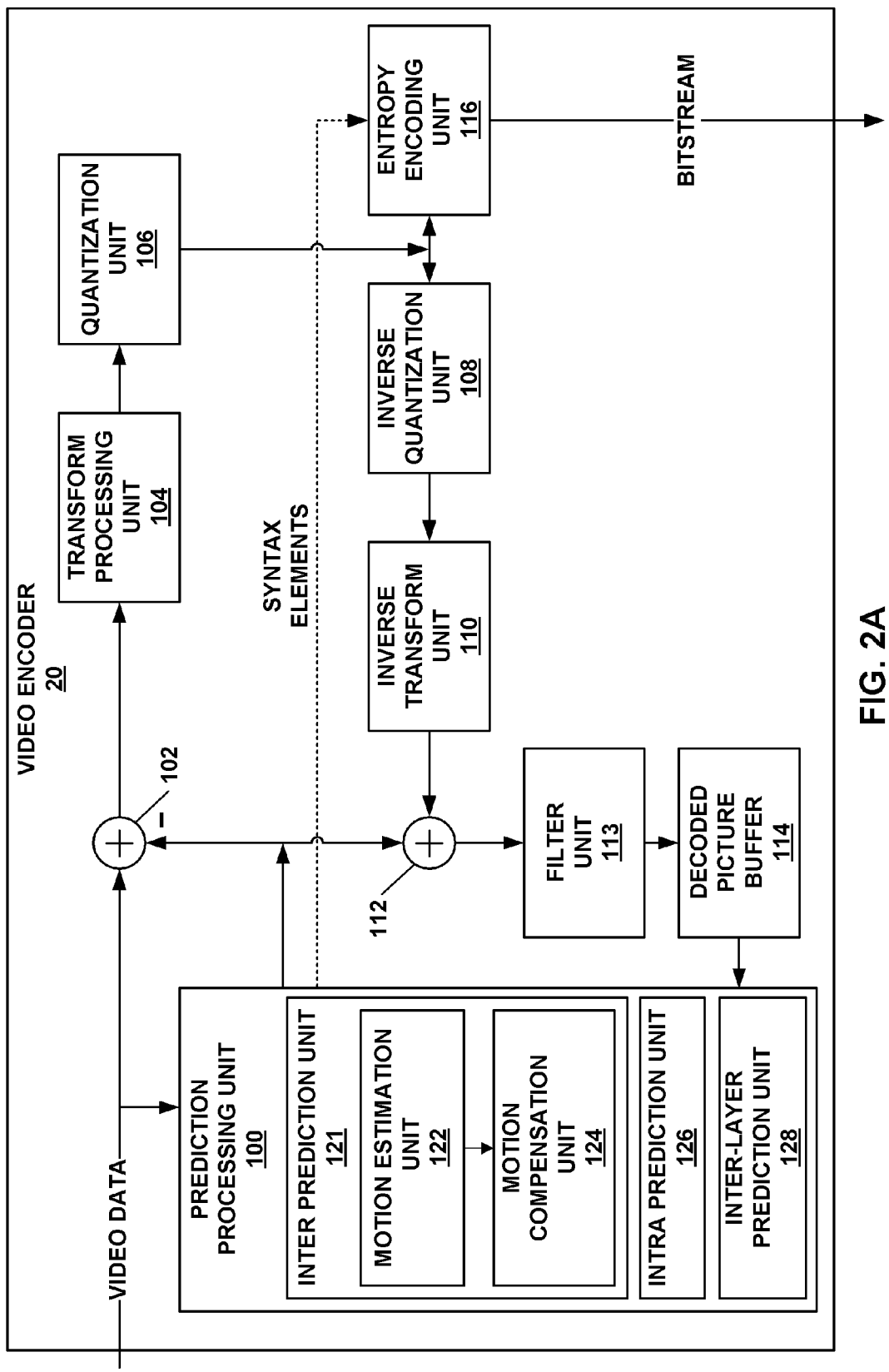
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2A separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in the scalable extension to HEVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
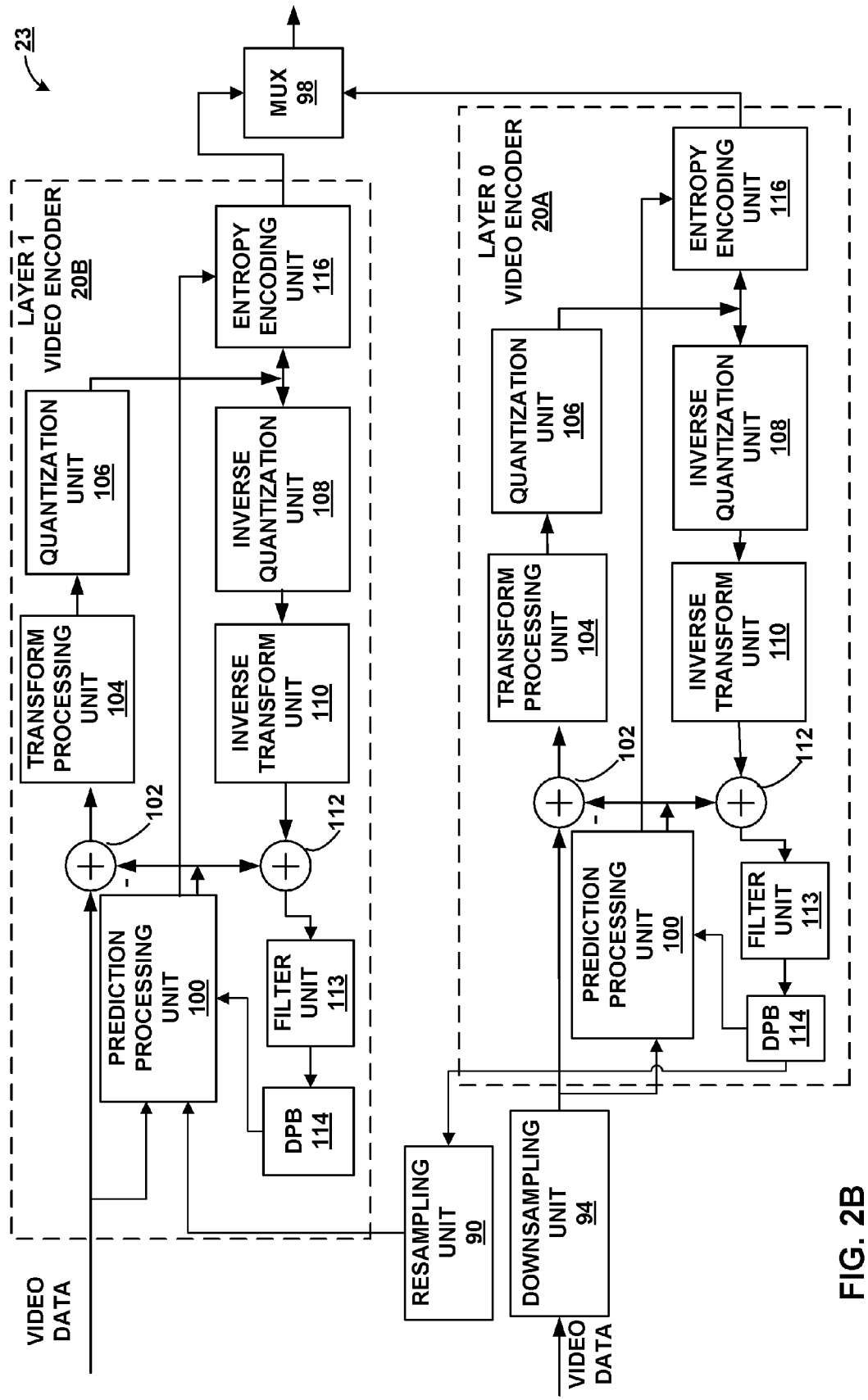
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. The video encoder 23 may be configured to process multi-layer video frames, such as for SHVC and MV-HEVC. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor (or mux) 98. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
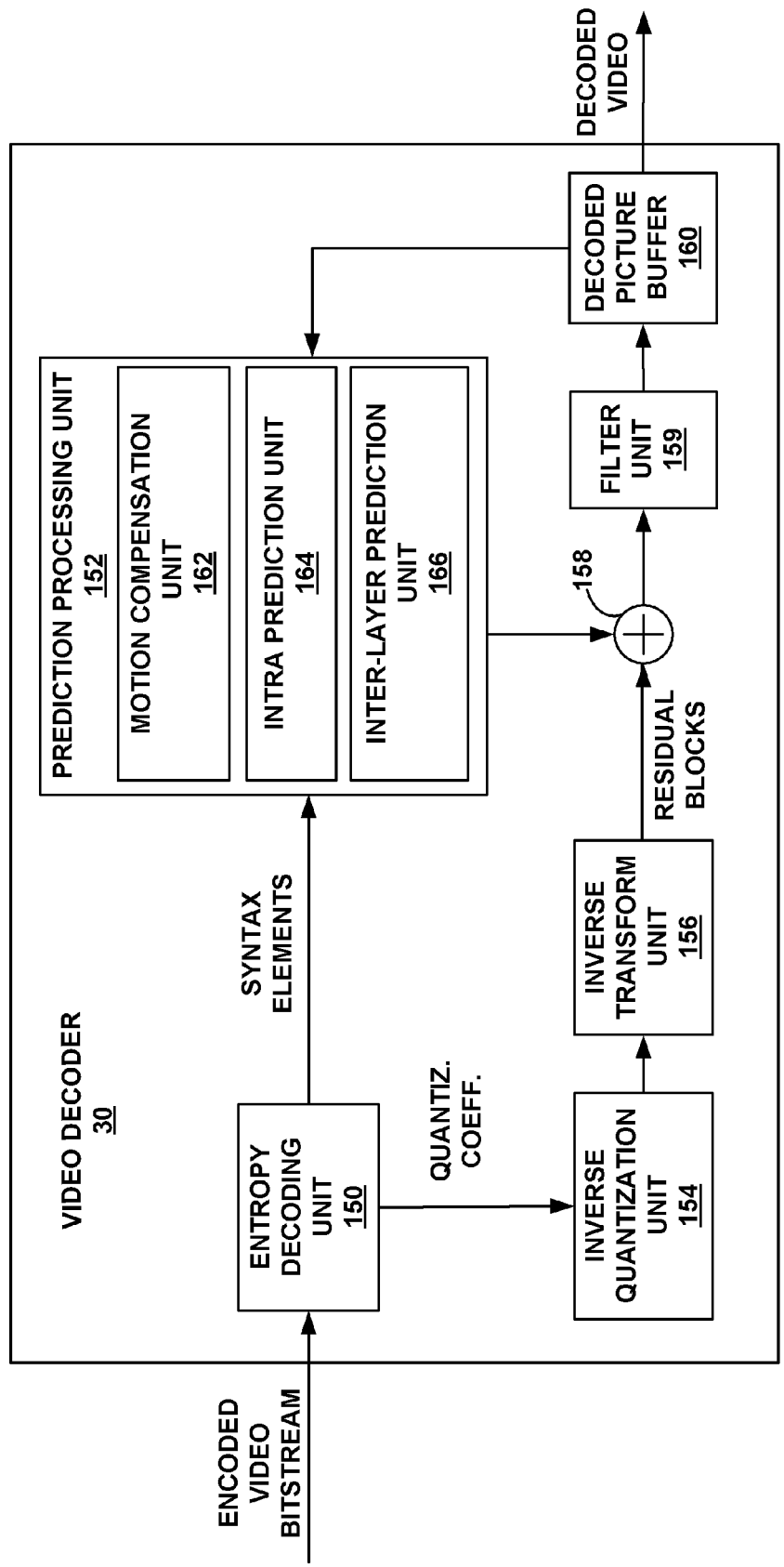
FIG. 3A is a block diagram illustrating an example of a video decoder that may implement techniques in accordance with aspects described in this disclosure.

FIG. 3A is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2A. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, then intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in the scalable extension to HEVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Multi-Layer Decoder

Figure 3B:
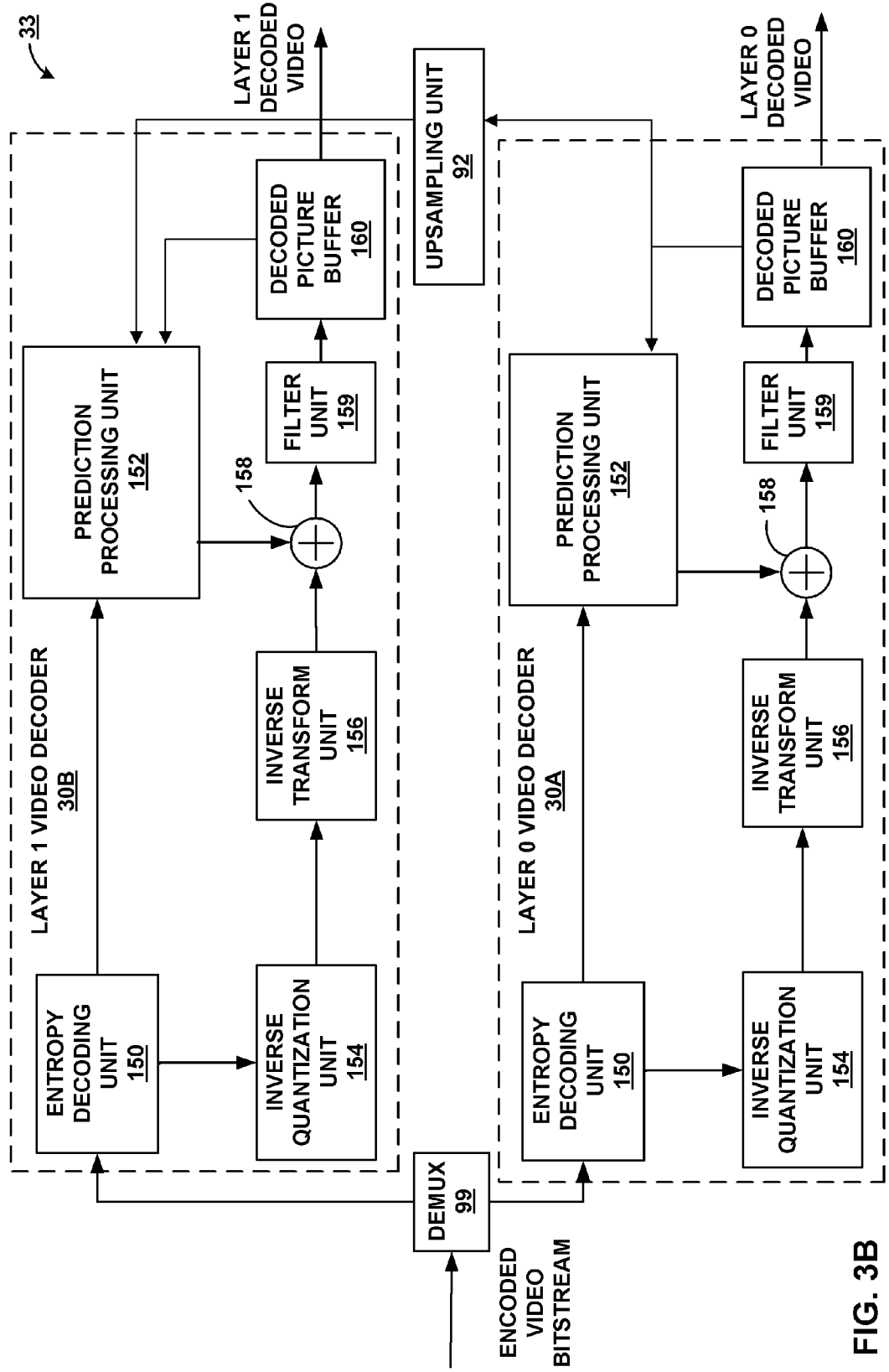
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor (or demux) 99. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, all pictures that follow a random access point in decoding order, except random access skipped leading (RASL) pictures, can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as intra random access point (TRAP) pictures. For example, a random access point associated with an enhancement layer TRAP picture in an enhancement layer ("layerA") that is contained in an access unit ("auA") may provide layer-specific random access such that for each reference layer ("layerB") of layerA (e.g., a reference layer being a layer that is used to predict layerA) having a random access point associated with a picture contained in an access unit ("auB") that is in layerB and precedes auA in decoding order (or a random access point contained in auA), the pictures in layerA that follow auA in decoding order (including those pictures located in auA), are correctly decodable without needing to decode any pictures in layerA that precede auA.

TRAP pictures may be coded using intra prediction (e.g., coded without referring to other pictures) and/or inter-layer prediction, and may include, for example, instantaneous decoder refresh (IDR) pictures, clean random access (CRA) pictures, and broken link access (BLA) pictures. When there is an IDR picture in the bitstream, all the pictures that precede the IDR picture in decoding order are not used for prediction by pictures that follow the IDR picture. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as RASL pictures. Another type of picture that can follow an TRAP picture in decoding order and precede the TRAP picture in output order is a random access decodable leading (RADL) picture, which may not contain references to any pictures that precede the TRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., having a layer ID value of 0) that is an TRAP picture may be referred to as an TRAP access unit.

End of Bitstream NAL Units

Figure 4:
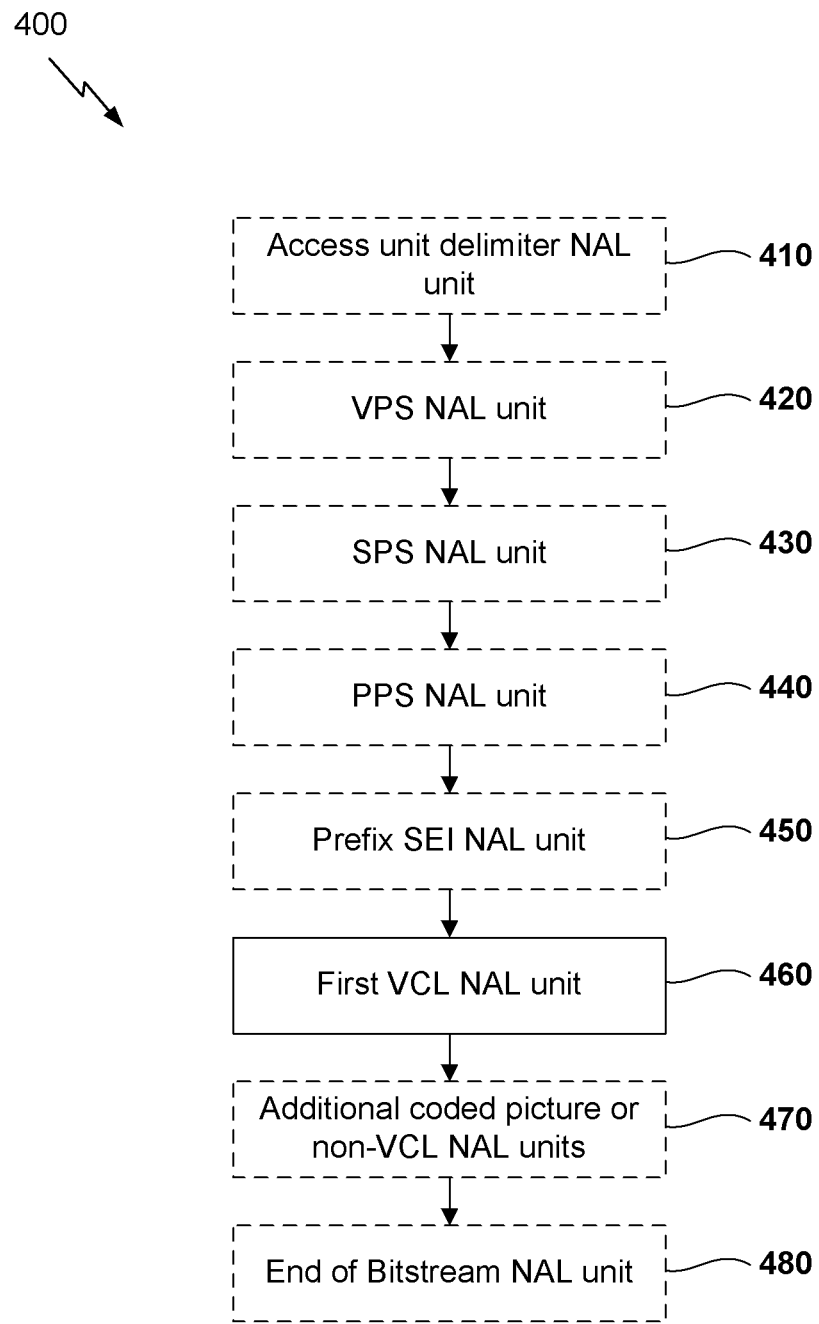
FIG. 4 is a block diagram illustrating an access unit of a multi-layer bitstream in accordance with aspects described in this disclosure.

FIG. 4 is a block diagram illustrating an access unit of a multi-layer bitstream according to an embodiment. As shown in FIG. 4, an access unit 400 includes a first Video Coding Layer (VCL) NAL unit 460 and may include one or more other optional NAL units. For example, the access unit 400 may include one or more of each of the following: an access unit delimiter NAL unit 410, a VPS NAL unit 420, an SPS NAL unit 430, a PPS NAL unit 440, a prefix SEI NAL unit 450, additional coded picture or non-VCL NAL units 470, and an EoB NAL unit 480. Each of the listed optional NAL units may be included depending on the aspects of the implementation and other syntax structures may also be included depending on the video coding scheme employed to encode or decode the access unit.

According to the HEVC scheme, when an EoB NAL unit 480 is present in the access unit 400, the next access unit shall be an TRAP access unit, which may be an IDR access unit, a BLA access unit, or a CRA access unit in order for the coded bitstream to conform to the HEVC scheme. Accordingly, when included in an access unit, the EoB NAL unit 480 indicates that the following access unit is an TRAP access unit.

In conventional single-layer coding schemes (e.g., HEVC version 1), each access unit uniquely corresponds to a single picture. Since each access unit contains a single picture, the terms "access unit" and "picture" were able to be used interchangeably in the context of single-layer coding schemes, for example, with respect to the utilization of recovery point SEI messages. However, the access units of multi-layer coding schemes may include a separate picture for each layer of the bitstream. In other words, in a multi-layer bitstream, a single access unit may contain (i.e., include or comprise) a plurality of pictures. In some multi-layer coding implementations, such as MV-HEVC and SHVC, each NAL unit includes a layer identifier which identifies the layer to which the NAL unit belongs. Accordingly, the layer of an EoB NAL unit is defined based on a value of the EoB NAL unit's layer identifier. In conventional single-layer coding schemes, the layer identifier for all NAL units are constricted to the same layer, namely layer zero. In other words, the NAL units of conventional single-layer coding schemes are all identified as belonging to the same layer. However, in multi-layer coding schemes, there are no such restrictions to the layer identifier included within NAL units, including the layer identifier associated with EoB NAL units.

Due to the unrestricted nature of the layer identifier of EoB NAL units in multi-layer coding schemes, a number of undesirable decoding errors may occur when the EoB NAL unit has a layer identifier with a value other than zero. As an example, a coded bitstream may include a base layer (BL) and an enhancement layer (EL). When the bandwidth between the encoder and decoder is restricted or drops below a certain level, the enhancement layer (or other layers that have a layer identifier other than layer zero) may be dropped (or processed incorrectly) from the bitstream to conserve bandwidth. This may occur, for example, when the bandwidth between a video encoder (e.g., the video encoder 20 or the video encoder 23) and a video decoder (e.g., the video decoder 30 or the video decoder 33) is limited. In this situation, if the EoB NAL unit has a layer identifier with a value of one ("1"), i.e., the EoB NAL unit is contained in the enhancement layer (EL), the EoB NAL unit will be dropped from the bitstream and will not be received by the decoder.

There are a number of functionalities of coding schemes which rely on the information contained within the EoB NAL unit. Accordingly, when the EoB NAL unit is dropped from the bitstream, these functions will not perform as expected. In one example, a decoder may decode a bitstream including a clean random access (CRA) access unit in different ways based on whether or not an EoB NAL unit is present immediately before the CRA access unit. Thus, if the EoB NAL unit is dropped from the enhancement layer, the decoding of the following CRA access unit will not be performed as expected. Similarly, other decoding functionalities rely on the existence of the EoB NAL unit for proper decoding, and thus, when the EoB NAL unit has a layer identifier value indicating a layer other than layer zero, the EoB NAL unit may be dropped since it is included in a layer other than the base layer, it is possible that the decoder will not be able to properly decode the bitstream.

Additionally, multi-layer coding standards do not define any additional functionality to allow an EoB NAL unit to have a layer identifier with a value other than zero. Accordingly, in at least one embodiment of the present disclosure, all EoB NAL units are set to have a layer identifier of zero. Specifically, according to the present disclosure, the encoding of the bitstream is performed based on a constraint that the EoB NAL units have a layer identifier of zero. By restricting the layer identifier of all EoB NAL units to layer zero, the NAL units will not be dropped (or processed incorrectly) since, as discussed above, only NAL units having a layer identifier other than layer zero are dropped.

RPSs

Video coding schemes may maintain an RPS associated with a picture of the coded video sequence (CVS). The RPS for a given picture contains a set of reference pictures including all reference pictures prior to the associated picture in decoding order that may be used for inter prediction of the associated picture or any picture following the associated picture in decoding order. As an example, in the HEVC scheme, the RPS includes five RPS lists, three of which are referred to collectively as the short-term RPSs and the remaining two which are collectively referred to as the long-term RPSs. The short-term RPSs contains all reference pictures that may be used for inter prediction of the associated picture and one or more pictures following the associated picture in decoding order. The long-term RPSs contains all reference pictures that are not used for inter prediction of the associated picture but may be used for inter predication of one or more pictures that follow the associated picture in decoding order.

Figure 5:
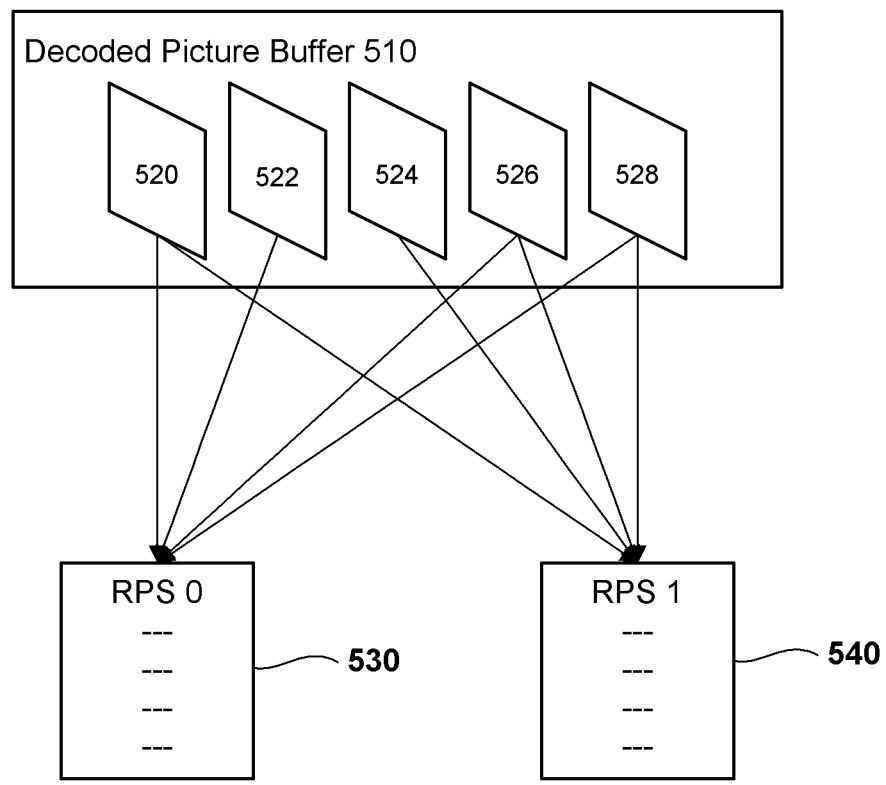
FIG. 5 is a block diagram illustrating an example of how an RPS is generated by an encoder or decoder.

FIG. 5 is a block diagram illustrating an example of how an RPS is generated by an encoder or decoder. In the following description, the decoded picture buffer 510 will be described as included in a decoder (e.g. the video decoder 30 or the video decoder 33), however the following applies equally to an encoder. As shown in FIG. 5, a plurality of pictures 520 to 528 are held in the decoded picture buffer 510 of the decoder. An RPS may be generated for a picture and may include references to pictures contained in the decoded picture buffer 510. The first RPS list 530 includes pictures 520, 522, 526, and 528 while the second RPS list 540 includes pictures 520, 524, 526, and 528. The embodiment of FIG. 5 is only an example and the pictures included in an RPS can be any pictures from the bitstream which are used for reference according to the conditions of the coding scheme used to encode the bitstream. The RPS lists 530 and 540 may be conventional RPS lists including pictures that are used as references for decoding pictures within the same layer or may be inter-layer RPS lists used for decoding pictures in different layers.

Multiview video coding schemes, such as the scalable and multiview extensions to the HEVC scheme, expand the use of RPSs to include RPSs for inter-layer prediction. In some embodiments, an RPS is defined for each layer of the bitstream, i.e., each picture maintains its own RPS. Further, additional RPSs may be provided which include lists of pictures used for inter-layer prediction of the associated picture. The inter-layer RPS for each picture may be divided into subsets which correspond to the layers of the bitstream. For example, in a 2 layer bitstream, the inter-layer RPS may be divided into a layer zero subset and a layer one subset which will be respectively referred to hereinafter as RPS inter-layer zero and RPS inter-layer one.

As previously described, pictures may be dropped (or processed incorrectly) from the bitstream for various reasons such as bandwidth requirements or the pictures may be lost in transmission between the encoder and decoder. When a candidate inter-layer reference picture is not present in the bitstream received by a decoder, i.e., a reference picture identified in an RPS inter-layer subset is not received, an entry of "no reference picture" indicating that no reference picture exists should be inserted into the corresponding RPS inter-layer subset. The appropriate subset may be determined based on the view identifier (ID) of the current layer, the view ID of the layer to which the candidate inter-layer reference picture belongs, and the view ID of the base layer. Here, the view ID refers is analogous to the layer ID and may refer to the view of the picture within a multiview encoding standard.

In the current scalable and multiview extensions, the "no reference picture" entry is only entered into the RPS inter-layer zero, even if the candidate inter-layer reference picture, had it been received by the decoder, would have been added to the RPS inter-layer one. This behavior is undesirable since the entry of "no reference picture" should be indicated in the location where the missing inter-layer reference picture would have been entered. Without correction, this behavior could result in undesired or incorrect relative positioning of inter-layer reference pictures in the two RPS inter-layer subsets when an inter-layer reference picture is missing. In addition, this behavior could also result in the sizes of the lists contained in the RPS inter-layer subsets being incorrect. This could potentially lead to incorrect referencing of the inter-layer reference pictures when decoding the bitstream. Accordingly, another object of this disclosure is to correct this behavior.

In one embodiment, the view ID of the current picture is used to determine which RPS inter-layer subset an entry of "no reference picture" is inserted into. For example, when a candidate inter-layer reference picture is not present for a picture, an entry of "no reference picture" is included into the corresponding RPS inter-layer subset based on the view ID of the missing inter-layer reference picture. In other embodiments, the view ID of other layer may also be used in the determination of which RPS inter-layer subset corresponding to the missing candidate inter-layer reference picture. For example, the view ID of the candidate inter-layer reference picture, and the view ID of the base layer may be used in the determination. Thus, by including the entry of "no reference picture" into the corresponding RPS inter-layer subset, the relative positioning of inter-layer reference pictures in the RPS inter-layer subsets can be corrected and the respective sizes of the RPS inter-layer subsets can also be corrected.

Another aspect of the present disclosure may address an incorrect inference of a loss in the transmission of the bitstream. The scalable and multiview extensions propose the inclusion of a discardable flag that indicates whether the picture associated with the discardable flag is neither used for inter-layer prediction nor for inter prediction by any other picture. In some embodiments, this flag is included in the slice header of the bitstream and has the same value for all slice segments within the associated picture. In the conventional multi-layer coding schemes, when a picture has an associated discardable flag indicating that the picture is discardable, there is no requirement that the discardable picture is not present in any temporal or inter-layer RPSs. Further, the conventional schemes also do not disallow a discardable picture from being present in reference picture lists, as long as no PU refers to a PU in the discardable picture. Thus, a discardable picture may be included in an RPS or reference picture list so long as it is not used for reference.

If a discardable picture is included in an RPS or reference picture list, a decoder may incorrectly infer a loss and/or may introduce bandwidth and decoding inefficiencies due to the inclusion. For example, when under bandwidth constraints, a discardable picture may be removed from the bitstream in order to save bandwidth since it will not be used for reference when decoding other pictures in the bitstream. When the discarded picture is included in an RPS, the decoder will recognize that the discarded picture may be used for reference by another picture that has not yet been received at the decoder. Since the decoder recognizes that the discarded picture may be used for reference, it may request retransmission of the discarded picture from the encoder. This behavior will reduce the bandwidth savings that were initially gained in discarding the discardable picture and lead to inefficiencies in the decoder.

Accordingly, in at least one embodiment, picture which are associated with a discardable flag indicating that the picture is discardable, i.e., having a value of one, are disallowed from being including in either of the inter-layer RPSs or the temporal RPSs.

In another embodiment, a used-for-reference flag may be uniquely associated with a picture. The used-for-reference flag indicates whether the associated picture is included in at least one RPS. In this embodiment, only pictures having a used-for-reference flag with a value of one are permitted to be included in an RPS.

Example Flowcharts for Encoding Video Information

Figure 6:
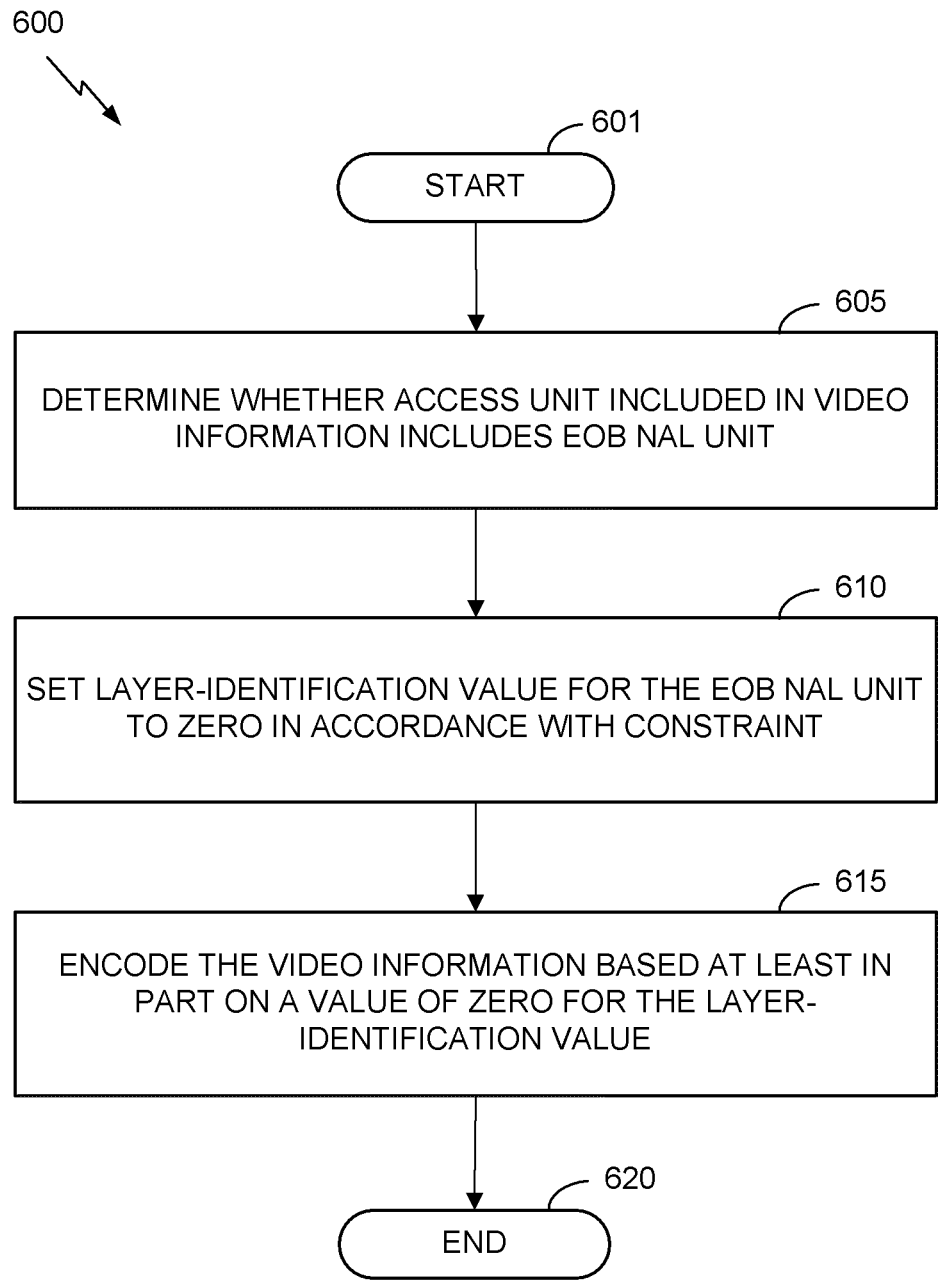
FIGS. 6-8 are flowcharts illustrating methods for encoding or decoding video information in accordance with aspects described in this disclosure.

With reference to FIG. 6, an example procedure for encoding video information based on an EoB NAL unit having a layer-identification value with a value of zero will be described. FIG. 6 is a flowchart illustrating a method 600 for encoding video information, according to an embodiment. The steps illustrated in FIG. 6 may be performed by a video encoder (e.g., the video encoder 20 or the video encoder 23), a video decoder (e.g., the video decoder 30 or the video decoder 33), or any other component. For convenience, method 600 is described as performed by a video encoder (also simply referred to as encoder), which may be the video encoder 20 or 23, the video decoder 30 or 33, or another component.

The method 600 begins at block 601. At block 605, the encoder determines whether an access unit included in video information includes an EoB NAL unit. At block 610, the encoder sets a layer-identification value for the EoB NAL unit to zero in accordance with a constraint. The video information to be encoded includes at least one EoB NAL unit which includes a layer-identification value that identifies the layer to which the EoB NAL unit belongs. At block 615, the encoder encodes the video information based at least in part on a value of zero for the layer-identification value. The method ends at 620.

Figure 7:
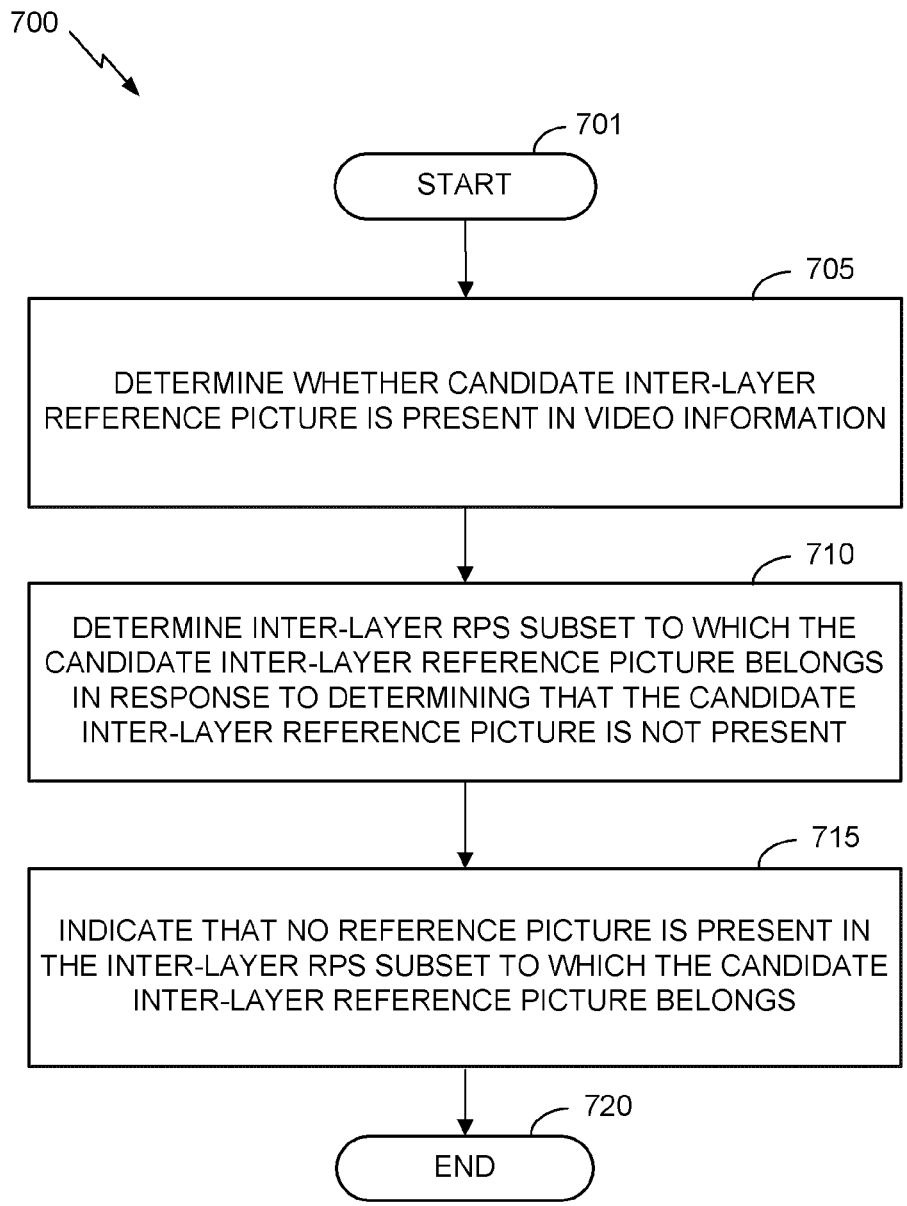

With reference to FIG. 7, an example procedure for indicating that no reference picture exists in an RPS inter-layer subset for video decoding will be described. FIG. 7 is a flowchart illustrating a method 700 for decoding video information, according to an embodiment. The steps illustrated in FIG. 7 may be performed by a video encoder (e.g., the video encoder 20 or the video encoder 23), a video decoder (e.g., the video decoder 30 or the video decoder 33), or any other component. For convenience, method 700 is described as performed by a video decoder (also simply referred to as decoder), which may be the video encoder 20 or 23 or the video decoder 30 or 33, or another component.

The method 700 begins at block 701. At block 705, the decoder determines whether a candidate inter-layer reference picture is present in video information. Pictures may be dropped from the coded video information in response to bandwidth limits or may be unexpectedly lost during transmission from an encoder. Thus, the decoder may determine whether the candidate inter-layer reference picture has been dropped from the video information by determining if the candidate inter-layer reference picture is present.

The method continues at block 710, where the decoder determines an RPS inter-layer subset to which the candidate inter-layer reference picture belongs in response to determining that the candidate inter-layer reference picture is not present. For example, this determination may include determining which subset the candidate inter-layer reference picture would have been included in if it were present in the video information. In some embodiments, this may include determining the view ID of the current layer, the view ID of the candidate inter-layer reference picture, and/or the view ID of the base layer.

Continuing at block 715, the decoder indicates that no reference picture is present in the RPS inter-layer subset to which the candidate inter-layer reference picture belongs. The method ends at 720.

Figure 8:
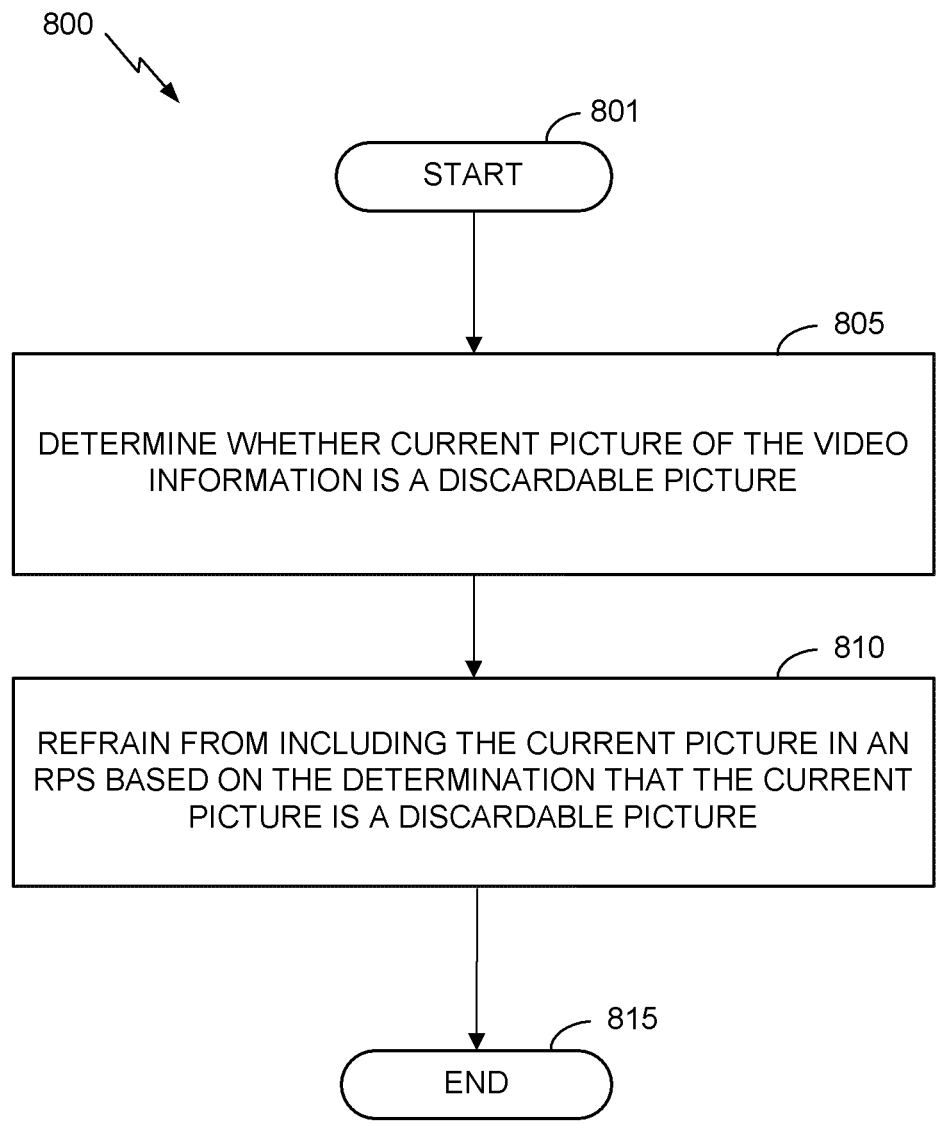

With reference to FIG. 8, an example procedure for determining whether to include a picture in an RPS for video coding will be described. FIG. 8 is a flowchart illustrating a method 800 for encoding video information, according to an embodiment. The steps illustrated in FIG. 8 may be performed by an encoder (e.g., the video encoder 20 of the video encoder 23), a video decoder (e.g., the video decoder 30 or the video decoder 33), or any other component. For convenience, method 800 is described as performed by a video encoder, which may be the video encoder 20 or 23, the video decoder 30 or 33, or another component.

The method 800 begins at block 801. At block 805, the encoder determines whether a current picture of video information is a discardable picture. Each picture may, for example, include a discardable flag which indicates whether the picture is a discardable picture. In some embodiments, a picture can be identified as a discardable picture only when it is not included in any RPS.

The method continues at block 810, where the encoder refrains from including the current picture in an RPS based on the determination that the current picture is a discardable picture. The method ends at 815.

In the methods 600 to 800, one or more of the blocks shown in FIGS. 6 to 8 may be removed (e.g., not performed) and/or the order in which the methods are performed may be switched. In some embodiments, additional blocks may be added to the methods 600 to 800. The embodiments of the present disclosure are not limited to or by the examples shown in FIGS. 6 to 8, and other variations may be implemented without departing from the spirit of this disclosure.

Example Implementation(s)

Some embodiments are summarized and described below. When certain portions of the HEVC specification are reproduced to illustrate the additions and deletions that may be incorporated to implement one or more of the methods described herein, such modifications are shown in italics and strikethrough, respectively.

Changes Related to the EoB NAL Unit

In some implementations of the present disclosure, EoB NAL units may be modified as described below.

TABLE 1

| EoB NAL unit semantics modifications |
|---|

7.4.2.4.4. Order of NAL units and coded pictures and their association to access units
This subclause specifies the order of NAL units and coded pictures and their association to access unit for CVSs that conform to one or more of the profiles specified in Annex A that are decoded using the decoding process specified in clauses 2 through 10.
An access unit consists of one coded picture and zero or more non-VCL NAL units. The association of VCL NAL units to coded pictures is described in subclause 7.4.2.4.5.
The first access unit in the bitstream starts with the first NAL unit of the bitstream.
The first of any of the following NAL units after the last VCL NAL unit of a coded picture specifies the start of a new access unit:
    access unit delimiter NAL unit (when present),
    VPS NAL unit (when present),
    SPS NAL unit (when present),
    PPS NAL unit (when present),
    Prefix SEI NAL unit (when present),
    NAL units with nal_unit_type in the range of RSV_NVCL41..RSV_NVCL44 (when present),
    NAL units with nal_unit_type in the range of UNSPEC48..UNSPEC55 (when present),
    first VCL NAL unit of a coded picture (always present).
The order of the coded pictures and non-VCL NAL units within an access unit shall obey the following constraints:
    When an access unit delimiter NAL unit is present, it shall be the first NAL unit. There shall be at most one access unit delimiter NAL unit in any access unit.
    When any prefix SEI NAL units are present, they shall not follow the last VCL NAL unit of the access unit.
    NAL units having nal_unit_type equal to FD_NUT or SUFFIX_SEI_NUT, or in the range of RSV_NVCL45..RSV_NVCL47 or UNSPEC56..UNSPEC63 shall not precede the first VCL NAL unit of the coded picture.
    When an end of sequence NAL unit is present, it shall be the last NAL unit in the access unit other than an end of bitstream NAL unit (when present).
    When an end of bitstream NAL unit is present, it shall be the last NAL unit in the access unit. The value of nuh_layer_id of the end of bitstream NAL unit shall be 0.
NOTE - VPS NAL units, SPS NAL units, PPS NAL units, prefix SEI NAL units, or NAL units with nal_unit_type in the range of RSV_NVCL41..RSV_NVCL44 or UNSPEC48..UNSPEC55, may be present in an access unit, but cannot follow the last VCL NAL unit of the coded picture within the access unit, as this condition would specify the start of a new access unit.

Changes to the Decoding Process of Inter-Layer RPS

In some implementations of the present disclosure, an inter-layer RPS may be modified as described below.

TABLE 2

| Inter-layer RPS semantics modifications |
|---|

G.8.1.2 Decoding process for inter-layer reference picture set
Outputs of this process are updated lists of inter-layer pictures RefPicSetInterLayer0 and RefPicSetInterLayer1 and the variables NumActiveRefLayerPics0 and NumActiveRefLayerPics1.
The lists RefPicSetInterLayer0 and RefPicSetInterLayer1 are first emptied, NumActiveRefLayerPics0 and NumActiveRefLayerPics1 are set equal to 0 and the following applies:
    for( i = 0; i < NumActiveRefLayerPics; i++ ) {
        if( there is a picture picX in the DPB that is in the same access unit as the current picture and has
                      nuh_layer_id equal to RefPicLayerId[ i ] ) {
            if( ( ViewId[ nuh_layer_id ] <= ViewId[ 0 ] &&
                      ViewId[ nuh_layer_id ] <= ViewId[ RefPicLayerId[ i ] ] ) ||
              ( ViewId[ nuh_layer_id ] >= ViewId[ 0 ] &&
                      ViewId[ nuh_layer_id ] >= ViewId[ RefPicLayerId[ i ] ] ) ) {
              RefPicSetInterLayer0[ NumActiveRefLayerPics0 ] = picX
              RefPicSetInterLayer0[ NumActiveRefLayerPics0++ ] is marked as "used for long-term reference"
            } else {
              RefPicSetInterLayer1[ NumActiveRefLayerPics1 ] = picX
              RefPicSetInterLayer1[ NumActiveRefLayerPics1++ ] is marked as "used for long-term reference"
            }
        } else
            if( ( ViewId[ nuh_layer_id ] <= ViewId[ 0 ] &&
                      ViewId[ nuh_layer_id ] <= ViewId[ RefPicLayerId[ i ] ] )
||
              ( ViewId[ nuh_layer_id ] >= ViewId[ 0 ] &&
                      ViewId[ nuh_layer_id] >= ViewId[ RefPicLayerId[ i ] ] ) )
            RefPicSetInterLayer0[ NumActiveRefLayerPics0++ ] = "no reference picture"
        else
            RefPicSetInterLayer1[ NumActiveRefLayerPics1++ ] = "no reference picture"
    }
There shall be no entry equal to "no reference picture" in RefPicSetInterLayer0 or RefPicSetInterLayer1.
There shall be no picture that has discardable_flag equal to 1 in RefPicSetInterLayer0 or TABLE 2-continued Inter-layer RPS semantics modifications RefPicSetInterLayer1.
If the current picture is a RADL picture, there shall be no entry in RefPicSetInterLayer0 or RefPicSetInterLayer1 that is a RASL picture.
NOTE - An access unit may contain both RASL and RADL pictures.

Changes to the Decoding Process of RPS

In some implementations (e.g., SHVC, MV-HEVC, etc.), the RPS may be modified as described below.

TABLE 3

RPS semantics modifications 8.3.2   Decoding process for reference picture set
...
It is a requirement of bitstream conformance that the RPS is restricted as follows:
    There shall be no entry in RefPicSetStCurrBefore, RefPicSetStCurrAfter, or RefPicSetLtCurr for which
    one or more of the following are true:
        The entry is equal to "no reference picture".
        The entry is a sub-layer non-reference picture and has TemporalId equal to that of the current
        picture.
        The entry is a picture that has TemporalId greater than that of the current picture.
    There shall be no entry in RefPicSetLtCurr or RefPicSetLtFoll for which the difference between the
    picture order count value of the current picture and the picture order count value of the entry is greater
    than or equal to $2^{24}$.
    When the current picture is a TSA picture, there shall be no picture included in the RPS with TemporalId
    greater than or equal to the TemporalId of the current picture.
    When the current picture is an STSA picture, there shall be no picture included in RefPicSetStCurrBefore,
    RefPicSetStCurrAfter, or RefPicSetLtCurr that has TemporalId equal to that of the current picture.
    When the current picture is a picture that follows, in decoding order, an STSA picture that has
    TemporalId equal to that of the current picture, there shall be no picture that has TemporalId equal to that
    of the current picture included in RefPicSetStCurrBefore, RefPicSetStCurrAfter, or RefPicSetLtCurr that
    precedes the STSA picture in decoding order.
    When the current picture is a CRA picture, there shall be no picture included in the RPS that precedes, in
    decoding order, any preceding IRAP picture in decoding order (when present).
    When the current picture is a trailing picture, there shall be no picture in RefPicSetStCurrBefore,
    RefPicSetStCurrAfter, or RefPicSetLtCurr that was generated by the decoding process for generating
    unavailable reference pictures as specified in clause 8.3.3.
    When the current picture is a trailing picture, there shall be no picture in the RPS that precedes the
    associated IRAP picture in output order or decoding order.
    When the current picture is a RADL picture, there shall be no picture included in RefPicSetStCurrBefore,
    RefPicSetStCurrAfter, or RefPicSetLtCurr that is any of the following:
        A RASL picture
        A picture that was generated by the decoding process for generating unavailable reference
        pictures as specified in clause 8.3.3
        A picture that precedes the associated IRAP picture in decoding order
    When sps_temporal_id_nesting_flag is equal to 1, the following applies:
        Let tIdA be the value of TemporalId of the current picture picA.
        Any picture picB with TemporalId equal to tIdB that is less than or equal to tIdA shall not be
        included in RefPicSetStCurrBefore, RefPicSetStCurrAfter, or RefPicSetLtCurr of picA when
        there exists a picture picC that has TemporalId less than tIdB, follows picB in decoding order,
        and precedes picA in decoding order.
    There shall be no picture in the RPS that has discardable_flag equal to 1.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, circuits, and algorithm steps described in connection with the embodiments disclosed herein may be implemented as electronic hardware, computer software, or combinations of both. To clearly illustrate this interchangeability of hardware and software, various illustrative components, blocks, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. A method for decoding video information of a multi-layer bitstream, comprising:
   determining whether a candidate inter-layer reference picture is present in the video information, wherein the video information comprises an inter-layer reference picture set (RPS) including a plurality of subsets, the candidate inter-layer reference picture being an inter-layer reference picture which has not yet been placed in an RPS subset;
   in response to determining that the candidate inter-layer reference picture is not present, determining an inter-layer RPS subset to which the candidate inter-layer reference picture belongs, the determining of the inter-layer RPS subset to which the candidate inter-layer reference picture belongs being based at least in part on a view identifier of the candidate inter-layer reference picture;
   indicating that no reference picture is present in the inter-layer RPS subset to which the candidate inter-layer reference picture belongs; and
   decoding the video bitstream based at least in part on the indication that no reference picture is present in the inter-layer RPS subset to which the candidate inter-layer reference picture belongs.

2. The method of claim 1, wherein the determining the inter-layer RPS subset to which the candidate inter-layer reference picture belongs is based on: i) a view identifier of a current layer, ii) the view identifier of the candidate inter-layer reference picture, and iii) a view identifier of a base layer.

3. The method of claim 1, wherein the decoding the video information is based at least in part on a multiview video coding standard.

4. A device for decoding video information of a multi-layer bitstream, comprising:
   a memory configured to store the video information; and
   a processor in communication with the memory and configured to:
     determine whether a candidate inter-layer reference picture is present in the video information, wherein the video information comprises an inter-layer reference picture set (RPS) including a plurality of subsets, the candidate inter-layer reference picture being an inter-layer reference picture which has not yet been placed in an RPS subset;
     in response to a determination that the candidate inter-layer reference picture is not present, determine an inter-layer RPS subset to which the candidate inter-layer reference picture belongs, a determination of the inter-layer RPS subset to which the candidate inter-layer reference picture belongs being based at least in part on a view identifier of the candidate inter-layer reference picture;
     indicate that no reference picture is present in the inter-layer RPS subset to which the candidate inter-layer reference picture belongs;
     decode the video bitstream based at least in part on the indication that no reference picture is present in the inter-layer RPS subset to which the candidate inter-layer reference picture belongs.

5. The device of claim 4, wherein the processor is further configured to determine the inter-layer RPS subset to which the candidate inter-layer reference picture belongs based on: i) a view identifier of a current layer, ii) the view identifier of the candidate inter-layer reference picture, and iii) a view identifier of a base layer.

6. The device of claim 4, wherein the processor is further configured to decode the video information based at least in part on a multiview video coding standard.

7. A method for encoding video information of a multi-layer bitstream, comprising:
   determining whether an access unit included in the video information includes an end of bitstream (EoB) network abstraction layer (NAL) unit;
   setting a layer-identification value for the EoB NAL unit to zero in accordance with a constraint, the constraint being a restriction of all EoB NAL units within the bitstream to have a layer-identification value of zero; and encoding the video information based at least in part on a value of zero for the layer-identification value.

8. A device for encoding video information of a multi-layer bitstream, comprising:

a memory configured to store the video information; and a processor in communication with the memory and configured to:

determine whether an access unit included in the video information includes an end of bitstream (EoB) network abstraction layer (NAL) unit;

set a layer-identification value for the EoB NAL unit to zero in accordance with a constraint, the constraint being a restriction of all EoB NAL units within the bitstream to have a layer-identification value of zero; and encode the video information based at least in part on a value of zero for the layer-identification value.

* * * * *